(12) United States Patent
Tai

(10) Patent No.: US 10,122,399 B2
(45) Date of Patent: Nov. 6, 2018

(54) ANTENNA GROUND AND FEED SWAPPING IN HANDHELD APPLICATIONS

(71) Applicant: MediaTek Inc., Hsinchu (TW)

(72) Inventor: Chen-Fang Tai, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 134 days.

(21) Appl. No.: 15/051,880

(22) Filed: Feb. 24, 2016

(65) Prior Publication Data

US 2016/0172753 A1 Jun. 16, 2016

Related U.S. Application Data

(60) Provisional application No. 62/130,814, filed on Mar. 10, 2015.

(51) Int. Cl.
*H01Q 1/24* (2006.01)
*H04B 1/3827* (2015.01)
*H01Q 9/42* (2006.01)
*H01Q 5/50* (2015.01)

(52) U.S. Cl.
CPC .......... *H04B 1/3838* (2013.01); *H01Q 1/245* (2013.01); *H01Q 5/50* (2015.01); *H01Q 9/42* (2013.01)

(58) Field of Classification Search
None
See application file for complete search history.

(56) References Cited

U.S. PATENT DOCUMENTS

| 8,781,420 | B2 | 7/2014 | Schlub et al. |
| 2006/0264193 | A1 | 11/2006 | Wallace |
| 2011/0187615 | A1* | 8/2011 | Sakata ............. H01Q 1/521 343/722 |
| 2012/0112970 | A1* | 5/2012 | Caballero ............. H01Q 1/243 343/702 |
| 2013/0065543 | A1 | 3/2013 | Ayatollahi |
| 2013/0307740 | A1 | 11/2013 | Pajona et al. |
| 2014/0104128 | A1* | 4/2014 | Pu ............ H01Q 3/247 343/848 |
| 2015/0188599 | A1 | 7/2015 | Shi et al. |

(Continued)

FOREIGN PATENT DOCUMENTS

| EP | 1696503 A1 | 8/2006 |
| EP | 2237367 A1 | 10/2010 |

*Primary Examiner* — David Bilodeau
(74) *Attorney, Agent, or Firm* — Han IP PLLC; Andy M. Han

(57) ABSTRACT

Examples of techniques for antenna ground and feed swapping in handheld applications are described. A condition with respect to wireless communication of a handheld apparatus having one or more antennas may be detected in determining whether to operate the handheld apparatus in a first mode or a second mode of wireless communication. In response to a determination to operate the handheld apparatus in the first mode, a first feeding port and one or more first shorting ports may be electrically connected to at least one antenna of the one or more antennas each disposed adjacent a first distal end of the handheld apparatus. Alternatively, in response to a determination to operate the handheld apparatus in the second mode, a second feeding port and one or more second shorting ports may be electrically connected to at least one antenna or another antenna of the one or more antennas.

34 Claims, 9 Drawing Sheets

(56) References Cited

U.S. PATENT DOCUMENTS

2015/0372656 A1* 12/2015 Mow .................. H03H 7/38
  455/77
2016/0036127 A1* 2/2016 Desclos ................ H01Q 5/328
  343/745

* cited by examiner

ANTENNA GROUND AND FEED SWAPPING IN HANDHELD APPLICATIONS

CROSS REFERENCE TO RELATED PATENT APPLICATION

The present disclosure claims the priority benefit of U.S. Provisional Patent Application No. 62/130,814, filed on 10 Mar. 2015, which is incorporated by reference in its entirety.

TECHNICAL FIELD

The present disclosure is generally related to antennas and, more particularly, to antenna ground and feed swapping in handheld applications.

BACKGROUND

Unless otherwise indicated herein, approaches described in this section are not prior art to the claims listed below and are not admitted to be prior art by inclusion in this section.

An antenna is an electrical device which converts electric power into radio waves, and vice versa. Antennas are essential components of equipment and apparatuses that use radio or otherwise configured for wireless communication. Typically, an antenna includes an arrangement of metallic elements electrically connected to a transmitter and/or a receiver. During a transmission operation, an oscillating current of electrons forced through the antenna by a transmitter creates an oscillating electromagnetic (EM) field around the antenna elements. For a slot antenna such as those used in handheld applications, the maximum EM field is usually observed on an open end of the slot antenna, as shown in scenario 700A of FIG. 7. During a receiving operation, oscillating EM fields of an incoming radio wave exert force on electrons in the antenna elements to cause the electrons to move back and forth, thereby creating oscillating currents in the antenna. However, often times in handheld applications (e.g., mobile phones such as smartphones) the outgoing and incoming radio signals may be blocked by the hand and/or head of the user of the mobile phone, and this tends to significantly degrade the efficiency of the slot antenna. For example, in scenario 700B shown in FIG. 7, radio signals may be blocked by the hand of a user and thus the efficiency of slot antenna may be significantly degraded.

Further example scenarios of negative impact on antenna efficiency by hand and/or head of a user are illustrated in FIG. 8. For illustrative purpose, each scenario shown in FIG. 8 involves a handheld apparatus, e.g., a smartphone, with a top slot antenna and a bottom slot antenna. In scenario 800A, the handheld apparatus is held by a left hand of the user, resulting in good radio signals for the top slot antenna and poor radio signals for the bottom slot antenna. In scenario 800B, the handheld apparatus is held by a right hand of the user, resulting in good radio signals for both the top slot antenna and the bottom slot antenna. In scenario 800C, the handheld apparatus is held by the left hand of the user and is next to the head of the user, resulting in worse radio signals for the top slot antenna and poor radio signals for the bottom slot antenna. In scenario 800D, the handheld apparatus is held by the right hand of the user and is next to the head of the user, resulting in worse radio signals for the top slot antenna and good radio signals for the bottom slot antenna. In the example scenarios illustrated in FIG. 8, the terms "good", "worse" and "poor" define the quality of radio signals from high to low in order. In other words, the quality of "good" radio signals is better than the quality of "worse" radio signals, which is better than the quality of "poor" radio signals.

An existing approach to address this issue is illustrated in FIG. 9. This approach utilizes an antenna swapping scheme. In a pass-through mode under the antenna swapping scheme as shown in part (A) of FIG. 9, a bottom slot antenna (antenna 0) at or near a bottom distal end of a handheld apparatus 900, e.g., smartphone, is used for wireless transmission and receiving until efficiency of the bottom slot antenna is degraded due to blockage by the hand and/or head of the user, at which time the wireless transmission and receiving may be switched to a swapping mode, shown in part (B) of FIG. 9, to be performed through a top slot antenna (antenna 1) at or near a top distal end of the handheld apparatus 900 opposite the bottom distal end. Nevertheless, as shown in FIG. 9 that the open end of each of bottom and top slot antennas is on the same side of the handheld apparatus 900 (i.e., the right side as shown in FIG. 9), performance of the antennas may be even worse when the handheld apparatus 900 is held by the left hand and close to the head of the user. Moreover, there is the issue of specific absorption rate (SAR) while in the swapping mode. Besides, trace loss of the top slot antenna is rather high.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In one example implementation, a method may involve detecting a condition with respect to wireless communication of a handheld apparatus having one or more antennas to determine whether to operate the handheld apparatus in a first mode of wireless communication or in a second mode of wireless communication. In response to a determination to operate the handheld apparatus in the first mode, the method may involve electrically connecting a first feeding port and one or more first shorting ports to at least one antenna of the one or more antennas each disposed adjacent a first distal end of the handheld apparatus. Alternatively, in response to a determination to operate the handheld apparatus in the second mode, the method may involve electrically connecting a second feeding port and one or more second shorting ports to the at least one antenna or another antenna of the one or more antennas.

In another example implementation, an apparatus may include a casing, one or more antennas, a first feeding port, a second feeding port, one or more first shorting ports, one or more second shorting ports and a control circuit. The casing may have a first distal end, a second distal end opposite the first distal end, a first side and a second side opposite the first side, with the first side and the second side disposed between the first distal end and the second distal end. Each of the one or more antennas may be disposed adjacent the first distal end of the casing. The control circuit may be communicatively coupled to the one or more antennas and configured to perform a number of operations. The control circuit may detect a condition with respect to wireless communication through the one or more antennas to determine whether to operate in a first mode of wireless communication or in a second mode of wireless communication. In response to a determination to operate in the first mode, the control circuit may electrically connect the first feeding port and the one or more first shorting ports to at least one antenna of the one or more antennas. In response to a determination to operate in the second mode, the control circuit may electrically connect the second feeding port and the one or more second shorting ports to the at least one antenna or another antenna of the one or more antennas.

Implementations in accordance with the present disclosure utilize and reuse one or more antennas on the same distal end of a handheld apparatus, e.g., smartphone, and change radiation pattern for wireless communication. A symmetric antenna structure may be utilized. Advantageously, implementations in accordance with the present disclosure may solve the issue with degradation in antenna efficiency due to blockage by the hand and/or head of a user and suffered by conventional designs and approaches. With symmetric antenna structure and reuse of one or more antennas on the same distal end of the handheld apparatus with different radiation patterns to cope with signal blockage by the user in different postures, performance better than conventional designs and approaches can be achieved, e.g., when the handheld apparatus is held by the left hand and close to the head of the user or held by the right hand and close to the head of the user. Advantageously, there is no SAR issue and less trace loss associated with implementations in accordance with the present disclosure. Also advantageously, designs in accordance with the present disclosure are relatively simple to implement.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 9:
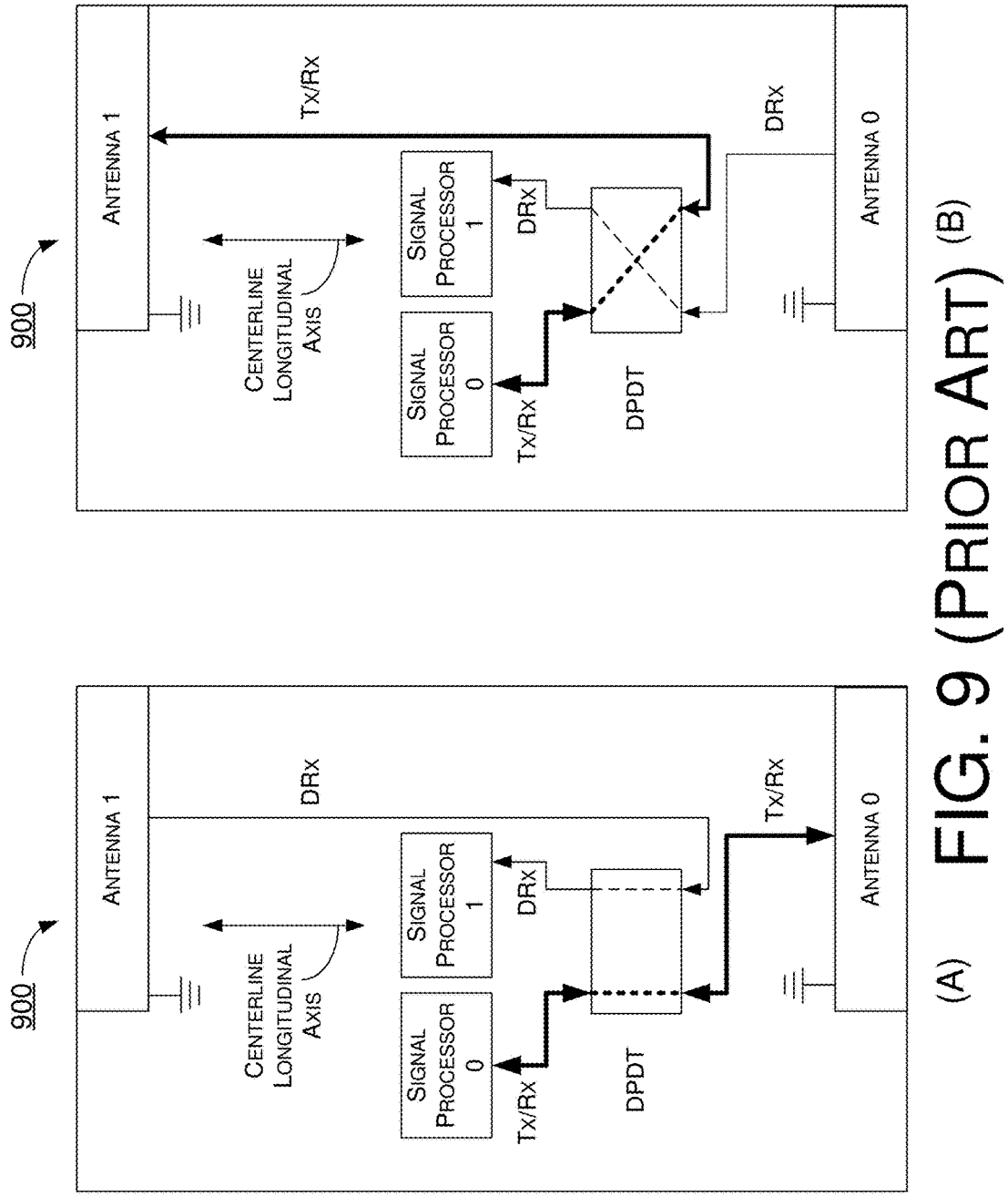
FIG. 9 is a diagram of a conventional approach to antenna swapping.

In some embodiments, one or more antennas on one distal end of a handheld apparatus (e.g., smartphone or other types of mobile phones) can be used for wireless communication (both transmission and receiving) with different radiation patterns to overcome degradation in antenna efficiency due to signal blockage by a user (e.g., hand and/or head of the user). Moreover, unlike conventional designs of slot antennas, such as that shown in FIG. 9 where both antenna 0 and antenna 1 are asymmetric with respect to a centerline longitudinal axis of apparatus 900 (i.e., off-centered with respect to the centerline), designs in accordance with the present disclosure may utilize a symmetric antenna structure such that the one or more antennas on a distal end of the apparatus may be symmetric with respect to the centerline longitudinal axis of the apparatus. Moreover, the apparatus may optionally include at least one auxiliary antenna on another distal end of the apparatus opposite to the distal end having the one or more antennas used for wireless communication. The auxiliary antenna may be used for wireless receiving to supplement signal reception by the one or more antennas on the opposite distal end of the apparatus.

Example Implementations

Figure 1:
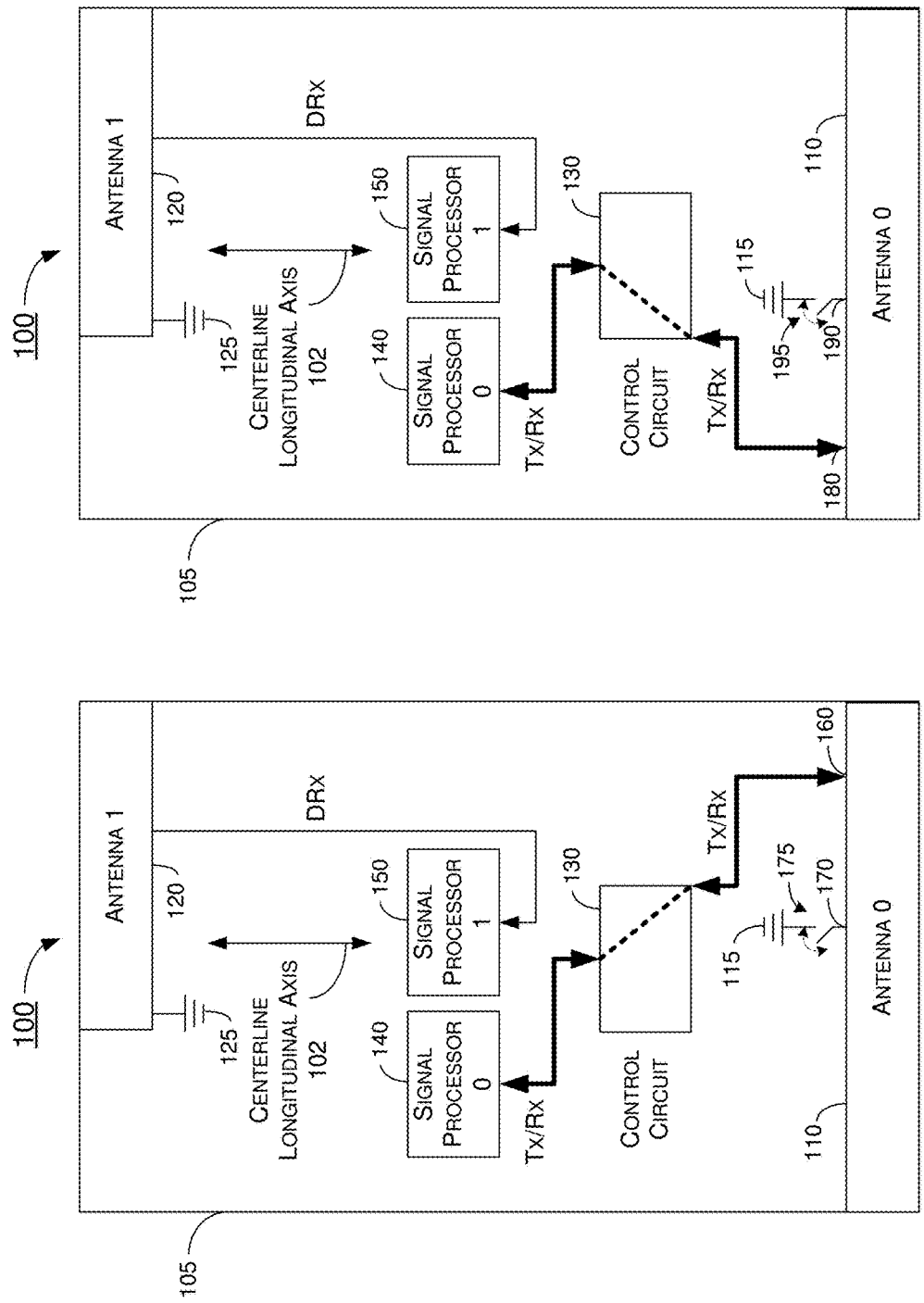
FIG. 1 is a diagram of an example apparatus in two different modes of wireless communication in accordance with an implementation of the present disclosure.

FIG. 1 illustrates an example apparatus 100 in two different modes of wireless communication in accordance with an implementation of the present disclosure. Apparatus 100 may be a handheld electronic apparatus that is portable/mobile and may be, for example and not limited to, a smartphone, a mobile phone, a portable communication apparatus or the like. Part (A) of FIG. 1 shows apparatus 100 in a pass-through mode of wireless communication, and part (B) of FIG. 1 shows apparatus 100 in a swapping mode of wireless communication.

Referring to FIG. 1, apparatus 100 may include a casing 105 having a first distal end (e.g., bottom end of apparatus 100 shown in FIG. 1), a second distal end (e.g., top end of apparatus shown in FIG. 1) which is opposite to the first distal end, a first side (e.g., right side of apparatus 100 shown in FIG. 1), and a second side (e.g., left side of apparatus 100 shown in FIG. 1) which is opposite to the first side. The first side and the second side of apparatus 100 may be disposed between the first distal end and the second distal end thereof. Apparatus 100 may include one or more antennas 110 disposed adjacent, near or at the first distal end of casing 105. For simplicity and not to obscure the drawing, the one or more antennas 110 is/are labeled as "antenna 0" in FIG. 1. The one or more antennas 110 may include a single antenna or two or more antennas, which may forma symmetric antenna structure with respect to a centerline longitudinal axis 102 of casing 105 and apparatus 100 in that the symmetric antenna structure may extend an equal amount toward each of the first side (e.g., right side) and the second side (e.g., left side) of casing 105 of apparatus 100. Apparatus 100 may include a first feeding port 160, a second feeding port 180, one or more first shorting ports 170 and one or more second shorting ports 190 that are associated with the one or more antennas 110. Each of the one or more first shorting ports 170 and one or more second shorting ports 190 may be directly or indirectly connected to one or more electrical grounds (e.g., electrical ground 115).

Apparatus 100 may also include an auxiliary antenna 120 disposed adjacent, near or at the second distal end of casing 105. For simplicity, auxiliary antenna 120 is labeled as "antenna 1" in FIG. 1. Auxiliary antenna 120 may be configured to receive wireless signals to supplement wireless receiving by the one or more antennas 110 in each of the pass-through mode and the swapping mode of wireless communication. In the example shown in FIG. 1, the one or more antennas 110 is/are disposed adjacent or near at the bottom side of casing 105 while auxiliary antenna 120 is disposed adjacent or near the top side of casing 105.

Apparatus 100 may further include a control circuit 130 which is communicatively coupled to the one or more antennas 110 and configured to perform a number of operations. For instance, control circuit 130 may detect a condition with respect to wireless communication through the one or more antennas 110 to determine whether to operate in a first mode of wireless communication (e.g., the pass-through mode) or in a second mode of wireless communication (e.g., the swapping mode). In response to a determination to operate in the first mode, control circuit 130 may electrically connect the first feeding port 160 and the one or more first shorting ports 170 to at least one antenna of the one or more antennas 110. Conversely, in response to a determination to operate in the second mode, control circuit 130 may electrically connect the second feeding port 180 and the one or more second shorting ports 190 to the at least one antenna or another antenna of the one or more antennas 110. In the first mode of wireless communication, the one or more antennas 110 may wirelessly transmit and receive with a first radiation pattern. In the second mode of wireless communication, the one or more antennas 110 may wirelessly transmit and receive with a second radiation pattern different from the first radiation pattern. In some implementations, control circuit 130 may be configured to support cross-polarized log-periodic dipole (CLPD) antenna for antenna swapping, and the one or more antennas 110 may form a CLPD antenna.

Apparatus 100 may also include a first signal processing circuit 140 (labeled as "signal processor 0" in FIG. 1) and a second signal processing circuit 150 (labeled as "signal processor 1" in FIG. 1). In some implementations of the present disclosure, first signal processing circuit 140 may be connected by control circuit 130 to the one or more antennas 110 in both the first mode (e.g., pass-through mode) of wireless communication, shown in part (A) of FIG. 1, and the second (e.g., swapping mode) of wireless communication, shown in part (B) of FIG. 1. Correspondingly, second signal processing circuit 150 may be connected by control circuit 130 to the auxiliary antenna 120 in both the first mode of wireless communication and the second mode (e.g., swapping mode) of wireless communication. Thus, in some implementations, first signal processing circuit 140 may be communicatively coupled to receive and process signals to be wirelessly transmitted through the one or more antennas 110 as well as signals wirelessly received through the one or more antennas 110 in both the first mode and the second mode. This is indicated by the label "Tx/Rx" in FIG. 1. Correspondingly, second signal processing circuit 150 may be communicatively coupled to receive signals wirelessly received through the auxiliary antenna 120 to supplement the signals wirelessly received by first signal processing circuit 140 through the one or more antennas 110. This is indicated by the label "DRx" in FIG. 1.

In some implementations, control circuit 130 may include a switching mechanism. The switching mechanism of control circuit 130 may be configured to connect first signal processing circuit 140 for signal transmission and receiving through an antenna of the one or more antennas 110 that is disposed adjacent or near the first side of casing 105 for the first mode of wireless communication. The switching mechanism of control circuit 130 may be also configured to connect first signal processing circuit 140 for signal transmission and receiving through an antenna of the one or more antennas 110 that is disposed adjacent or near the second side of casing 105 for the second mode of wireless communication. For instance, the switching mechanism of control circuit 130 may include a single pole, double throw (SPDT) switch, a single pole changeover (SPCO), a single pole, center off (SPTT) or any suitable type of switching device that can perform the function described above. In the example shown in FIG. 1, in the pass-through mode, control circuit 130 connects first signal processing circuit 140 to the one or more antennas 110 through the first feeding port 160 which is adjacent or near the first side (e.g., right side) of casing 105 while the one or more antennas 110 is/are connected to electrical ground 115 through the one or more first shorting ports 170. Similarly, in the swapping mode, control circuit 130 connects first signal processing circuit 140 to the one or more antennas 110 through the second feeding port 180 which is adjacent or near the second side (e.g., left side) of casing 105 while the one or more antennas 110 is/are connected to an electrical ground 115 through the one or more second shorting ports 190.

In some implementations, a distance between the first feeding port 160 and the first side of the casing may be less than a distance between the second feeding port 180 and the first side of the casing. Similarly, a distance between the second feeding port 180 and the second side of the casing may be less than a distance between the first feeding port 160 and the second side of the casing. Moreover, a distance between the one or more first shorting ports 170 and the first side of the casing may be less than a distance between the one or more second shorting ports 190 and the first side of the casing. Additionally, a distance between the one or more second shorting ports 190 and the second side of the casing may be less than a distance between the one or more first shorting ports 170 and the second side of the casing.

In some implementations, the first feeding port 160, the one or more first shorting ports 170, the second feeding port 180, and the one or more second shorting ports 190 may be associated with a first antenna of the one or more antennas 110. Alternatively, the first feeding port 160 and the one or more first shorting ports 170 may be associated with the first antenna of the one or more antennas 110, and the second feeding port 180 and the one or more second shorting ports 190 may be associated with a second antenna of the one or more antennas 110. Still alternatively, the first feeding port 160 and the one or more second shorting ports 190 may be associated with the first antenna of the one or more antennas 110, and the second feeding port 180 and the one or more first shorting ports 170 may be associated with a second antenna of the one or more antennas 110.

In some implementations, in detecting the condition with respect to wireless communication through the one or more antennas 110 to determine whether to operate in the first mode of wireless communication or in the second mode of wireless communication, control circuit 130 may be configured to perform a number of operations. For instance, control circuit 130 may detect a first radiation strength associated with a first signal received or transmitted by the one or more antennas 110 in the first mode of wireless communication. Moreover, control circuit 130 may detect a second radiation strength associated with a second signal received or transmitted by the one or more antennas 110 in the second mode of wireless communication. Furthermore, control circuit 130 may perform a comparison involving the first radiation strength and the second radiation strength. Additionally, control circuit 130 may determine to operate in either the first mode of wireless communication or the second mode of wireless communication based on a result of the comparison.

In some implementations, in determining to operate in either the first mode of wireless communication or the second mode of wireless communication based on the result of the comparison, control circuit 130 may be configured to perform a number of operations. For instance, control circuit 130 may determine to operate in the first mode of wireless communication in response to the result of the comparison indicating the first radiation strength being greater than the second radiation strength. On the other hand, control circuit 130 may determine to operate in the second mode of wireless communication in response to the result of the comparison indicating the second radiation strength being greater than the first radiation strength.

In some implementations, in detecting the condition with respect to wireless communication through the one or more antennas 110 to determine whether to operate in the first mode of wireless communication or in the second mode of wireless communication, control circuit 130 may be configured to perform a number of operations. For instance, control circuit 130 may operate in one of the first mode of wireless communication and the second mode of wireless communication as a default mode of wireless communication. Control circuit 130 may detect whether a first radiation strength associated with a first signal received or transmitted by the one or more antennas 110 in the default mode of wireless communication is below a threshold. Furthermore, control circuit 130 may determine whether to change the default mode of wireless communication based on the detecting.

Alternatively or additionally, in determining whether to change the default mode of wireless communication based on the detecting, control circuit 130 may be configured to perform a number of operations. For instance, in response to the first radiation strength associated with the first signal being not below the threshold, control circuit 130 may maintain in the default mode of wireless communication. Otherwise, in response to the first radiation strength associated with the first signal being below the threshold, control circuit 130 may performing additional operations. Control circuit 130 may detect that a second radiation strength associated with a second signal received or transmitted by the one or more antennas 110 in another mode of wireless communication. Control circuit 130 may then perform a comparison involving the first radiation strength and the second radiation strength. Control circuit 130 may determine to change from the default mode to the other mode of wireless communication in response to a result of the comparison indicating the second radiation strength being greater than the first radiation strength.

In some implementations, the one or more first shorting ports 170 may include a first port 170 (e.g., the one shown in FIG. 1) directly connected to electrical ground 115, and the one or more second shorting ports 190 may include a second port 190 (e.g., the one shown in FIG. 1) directly connected to electrical ground 115.

In some implementations, apparatus 100 may also include one or more first electrical elements 175 and one or more second electrical elements 195. In some implementations, the one or more antennas 110 may be connected to electrical ground 115 through the one or more first electrical elements 175 and the one or more first shorting ports 170 in the first mode of wireless communication, and the one or more antennas 110 may be connected to electrical ground 115 through the one or more second electrical elements 195 and the one or more second shorting port 190s in the second mode of wireless communication, as shown in FIG. 1. The one or more first shorting ports 170 may include a first port 170 (e.g., the one shown in FIG. 1) connected to electrical ground 115 through the one or more first electrical elements 175. The one or more second shorting ports 190 may include a second port 190 (e.g., the one shown in FIG. 1) connected to electrical ground 115 through the one or more second electrical elements 195.

In some implementations, the one or more first electrical elements 175 may include a first switching circuit and a plurality of first impedance elements (e.g., resistors, resistive elements and/or any electrical element having suitable impedance value(s)). The plurality of first impedance elements may be configured to provide different impedance values and may be serially coupled between the first port 170 and electrical ground 115. The one or more second electrical elements 195 may include a second switching circuit and a plurality of second impedance elements (e.g., resistors, resistive elements and/or any electrical element having suitable impedance value(s)). The plurality of second impedance elements may be configured to provide different impedance values and may be serially coupled between the second port 190 and electrical ground 115.

Alternatively, the one or more first shorting ports 170 may also include a third port (not shown in FIG. 1) connected to electrical ground 115 through the one or more first electrical elements 175, and the one or more second shorting ports 190 may also include a fourth port (not shown in FIG. 1) connected to electrical ground 115 through the one or more second electrical elements 195. In some implementations, the one or more first electrical elements 175 may include a first switching circuit and a plurality of first impedance elements. The plurality of first impedance elements may be configured to provide different impedance values and may be serially coupled between the first port 170 and the electrical ground. The one or more second electrical elements 195 may include a second switching circuit and a plurality of second impedance elements. The plurality of second impedance elements may be configured to provide different impedance values and may be serially coupled between the second port 190 and electrical ground 115.

In view of the above, when changing from one more of wireless communication to another mode of wireless communication apparatus 100 reuses the one or more antennas 110, having a symmetric antenna structure, and changes the radiation pattern of the one or more antennas 110. This design resolves or at least minimizes the issue with degradation in antenna efficiency due to blockage by the hand and/or head of a user. It is believed that the proposed design can achieve good antenna performance when apparatus 100 is held by the left hand or right hand and close to the head of the user. Moreover, the proposed design also eliminates the issue of specific absorption rate (SAR) while in the swapping mode, and trace loss is significantly reduced.

Figure 2:
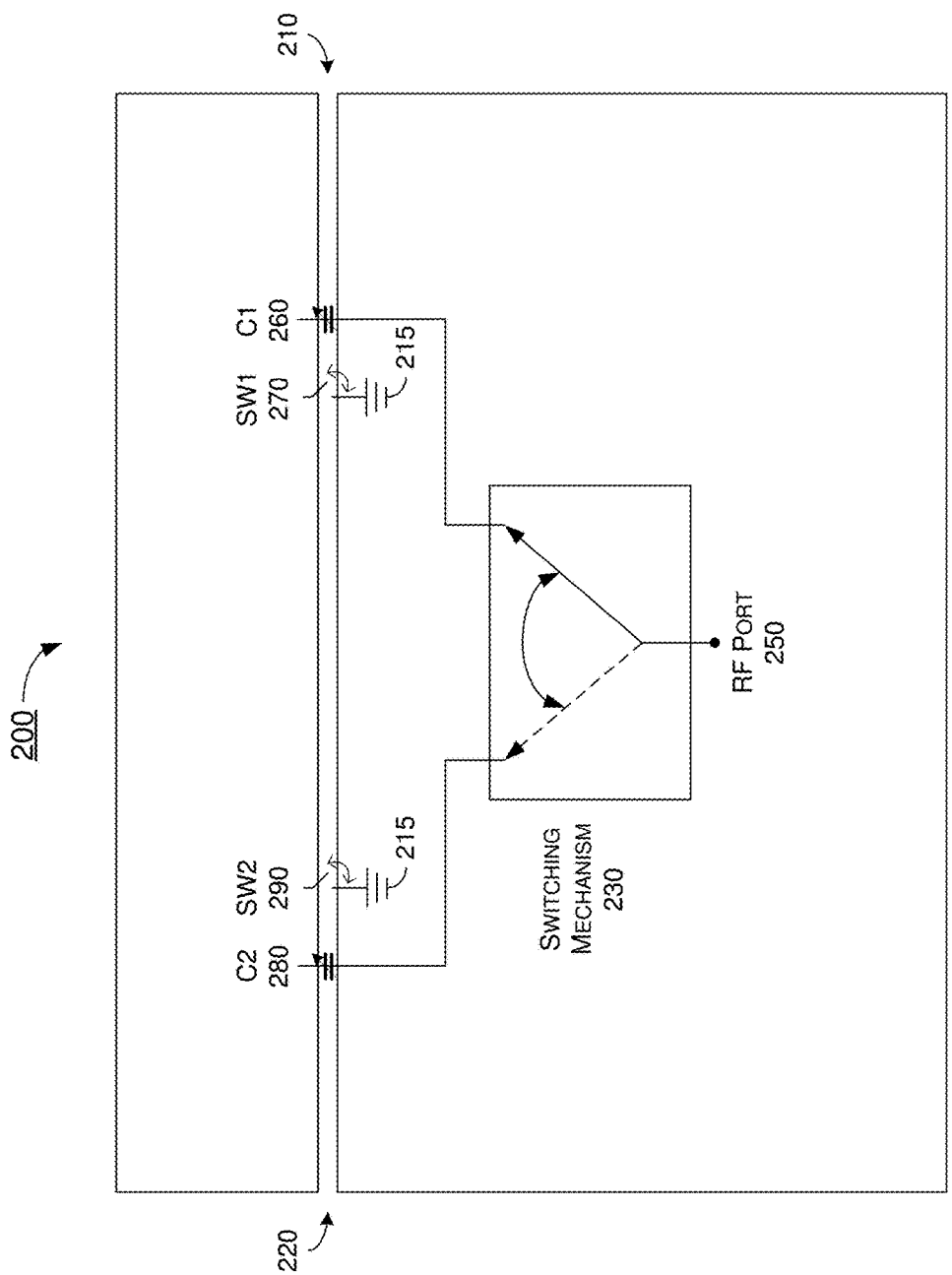
FIG. 2 is a diagram of an example antenna in accordance with an implementation of the present disclosure.

FIG. 2 illustrates an example antenna 200 in accordance with an implementation of the present disclosure. Antenna 200 may be an example implementation of the one or more antennas 110 of apparatus 100, and may have a symmetric antenna structure. For example, as shown in FIG. 2, antenna 200 may have a first slot 210 on or toward a first side (e.g., right side) of antenna 200 and a second slot 220 on or toward a second side (e.g., left side) of antenna 200.

Antenna 200 may include one or more first tunable components 260, one or more first switching components 270, one or more second tunable components 280 and one or more second switching components 290. For simplicity, in the following description and in FIG. 2 a singular term is used (e.g., "first tunable component 260" is used instead of "one or more first tunable components 260", "first switching component 270" is used instead of "one or more first switching components 270", "second tunable component 280" is used instead of "one or more second tunable components 280" and "second switching component 290" is used instead of "one or more second switching components 290") and a single unit is shown for each of the one or more first tunable components 260, one or more first switching components 270, one or more second tunable components 280 and one or more second switching components 290, although it is understood that there may be multiple units instead of a single unit. In this design, first switching component 270 and second switching component 290 may be utilized for ground/shorting point swapping for antenna 200. In some implementations, first tunable component 260 may be configured to function as a feeding port and first switching component 270 may be configured to function as a shorting port connected to an electrical ground 215. Alternatively, second tunable component 280 may be configured to function as a feeding port and second switching component 290 may be configured to function as a shorting port connected to electrical ground 215. Alternatively, first tunable component 260 may be configured to function as a feeding port and second switching component 290 may be configured to function as a shorting port connected to electrical ground 215. Alternatively, second tunable component 280 may be configured to function as a feeding port and first switching component 270 may be configured to function as a shorting port connected to electrical ground 215.

In some implementations, at least one of the first tunable component 260 and the second tunable component 280 may include a varactor, or any other electrical component that can provide variable capacitance. The varactor may be configured to be in either an isolation state or a connection state when the one or more antennas 200 operates in a radio frequency (RF) range which may include one or more ranges of frequencies. When the varactor is in the connection state, the respective varactor may be in a high-capacitance state (e.g., with low or no bias) such that the varactor presents a low impedance path, thereby rendering an electrical connection as in an electrical "short circuit" state. Moreover, when the varactor is in the isolation state, the varactor may be reverse biased and thus have its capacitance abruptly decreased to result in a high impedance path, thereby causing an electrical isolation as in an electrical "open circuit" state. Alternatively or additionally, at least one of the first tunable component 260 and the second tunable component 280 may include a transistor, a diode, or any suitable type of switching device which may be configured to be in either an isolation state or a connection state. In some implementations, at least one of first switching component 270 and second switching component 290 may include a transistor, a diode or a switch such as, for example, a single pole, single throw (SPST) switch. First switching component 270 and second switching component 290 may be configured to be in either an isolation state or a connection state.

A switching mechanism 230, which may or may not be a part of antenna 200, may be provided to electrically connect a radio frequency (RF) port 250 to either first tunable component 260 or second tunable component 280 for feeding point swapping for antenna 200. In some implementations, switching mechanism 230 may include a single pole, double throw (SPDT) switch. For instance, in a first mode of wireless communication, second switching component 290 may function as an antenna ground for antenna 200 while first switching component 270 may be utilized for low/high band matching. Correspondingly, in a second mode of wireless communication, first switching component 270 may function as an antenna ground for antenna 200 while second switching component 290 may be utilized for low/high band matching.

Figure 3:
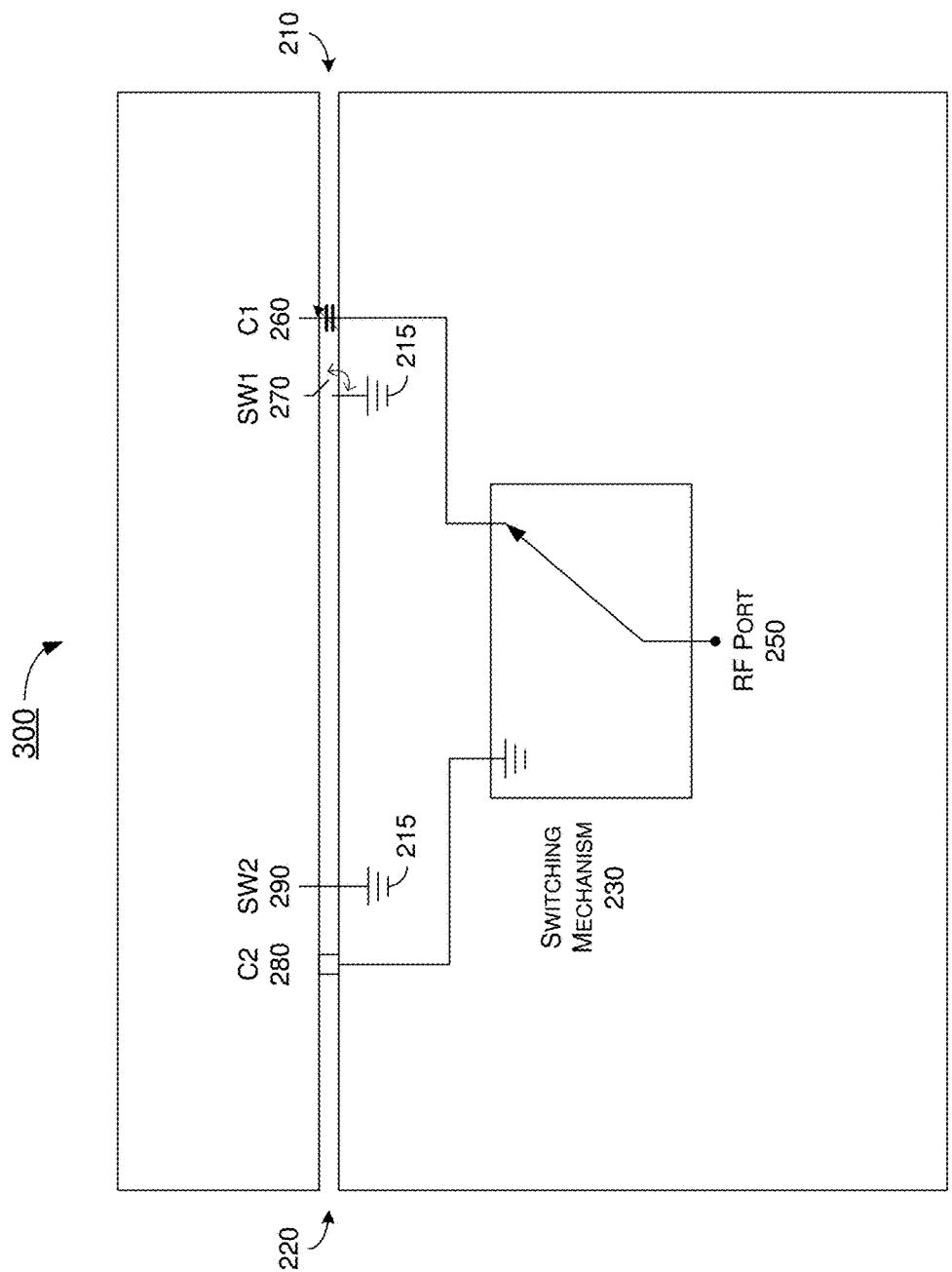
FIG. 3 is a diagram of a first configuration of the example antenna of FIG. 2 in a first mode of wireless communication in accordance with an implementation of the present disclosure.

FIG. 3 illustrates a first configuration 300 of antenna 200 in a first mode of wireless communication in accordance with an implementation of the present disclosure. As shown in FIG. 3, when in the first mode of wireless communication, second tunable component 280 may function as a feeding port for antenna 200 and second switching component 290 may function as a shorting port for antenna 200, with first switching component 270 in the isolation state and first tunable component 260 utilized for band matching. Also shown in FIG. 3, when in the first mode of wireless communication, switching mechanism 230 may electrically connect RF port 250 to first tunable component 260 to transmit and receive wireless signals.

Figure 4:
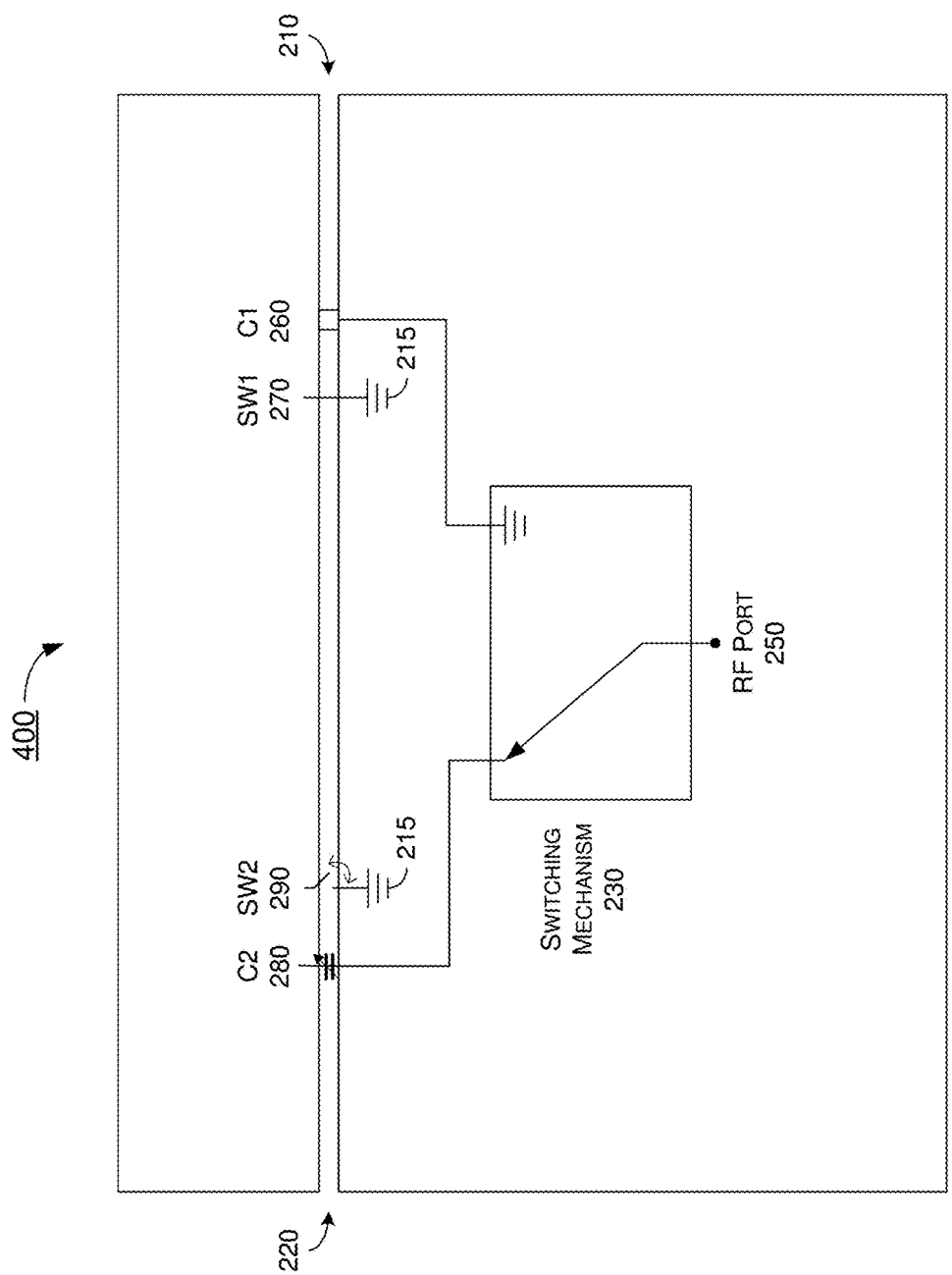
FIG. 4 is a diagram of a second configuration of the example antenna of FIG. 2 in a second mode of wireless communication in accordance with an implementation of the present disclosure.

FIG. 4 illustrates a second configuration 400 of antenna 200 in a second mode of wireless communication in accordance with an implementation of the present disclosure. As shown in FIG. 4, when in the second mode of wireless communication, first tunable component 260 may function as a feeding port for antenna 200 and first switching component 270 may function as a shorting port for antenna 200, with second switching component 290 in the isolation state and second tunable component 280 utilized for band matching. Also shown in FIG. 4, when in the second mode of wireless communication, switching mechanism 230 may electrically connect RF port 250 to second tunable component 280 to transmit and receive wireless signals.

Figure 5:
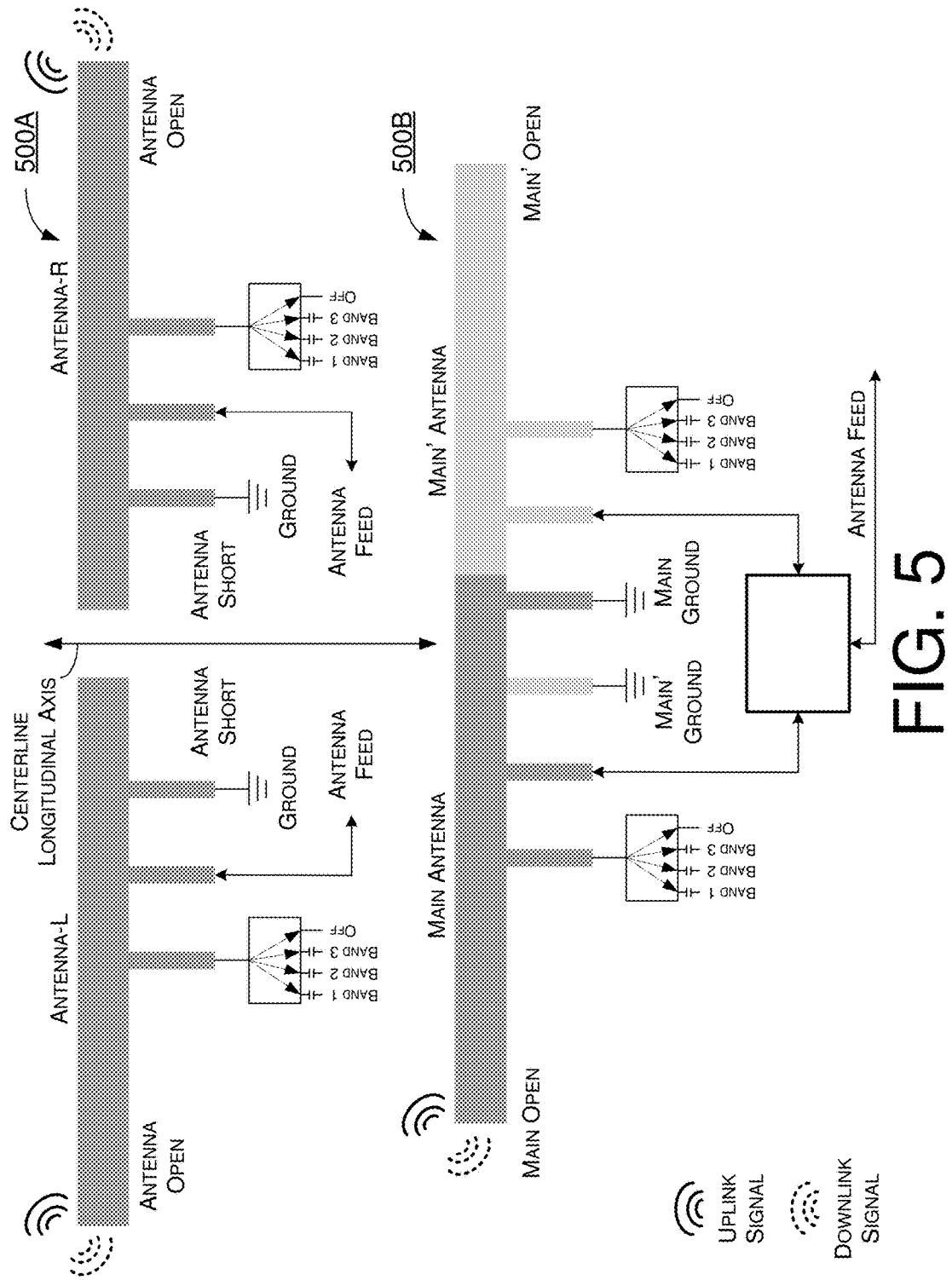
FIG. 5 is a diagram of example schemes of antenna utilization in accordance with an implementation of the present disclosure.

FIG. 5 illustrates example schemes 500A and 500B of antenna utilization in accordance with an implementation of the present disclosure. Each of scheme 500A and scheme 500B may be an example implementation of the one or more antennas 110 of apparatus 100. In scheme 500A, the one or more antennas 110 may be implemented by two antennas such as a left antenna (labeled as "antenna-L" in FIG. 5) and a right antenna (labeled as "antenna-R" in FIG. 5), with left antenna and right antenna being symmetric (e.g., mirror image-like) with respect to a centerline longitudinal axis. Each of the left antenna and right antenna has an open end which may be utilized for transmitting uplink signals and receiving downlink signals. Moreover, each of the left antenna and right antenna may have one or more shorting ports (although one shorting port is shown in FIG. 5) for antenna short, one or more feeding ports (although one feeding port is shown in FIG. 5) for antenna feed, and a matching port for band matching. In a first mode of wireless communication, the left antenna may function as a primary antenna while the right antenna may function as a secondary antenna. In a second mode of wireless communication, the right antenna may function as a primary antenna while the left antenna may function as a secondary antenna.

In scheme 500B, the one or more antennas 110 may be implemented by a single antenna which is symmetric with respect to the centerline longitudinal axis. In some implementations, the single antenna in scheme 500B may be formed by multiple (e.g., two) antennas such as, for example, the left antenna and right antenna described in scheme 500A. In the first mode of wireless communication, one side of the single antenna (e.g., left side in FIG. 5) may function as a primary antenna (labeled as "main antenna" in FIG. 5) while the other side of the single antenna (e.g., right side in FIG. 5) may function as a secondary antenna (labeled as "main' antenna" in FIG. 5). In the second mode of wireless communication, the roles of the left side and the right side of the single antenna may be reversed (e.g., the right side functioning as the primary antenna and the left side functioning as the secondary antenna). Each side of the single antenna may respectively have one or more shorting ports (although one shorting port is shown in FIG. 5) for antenna short, one or more feeding ports (although one feeding port is shown in FIG. 5) for antenna feed, and a matching port for band matching.

Figure 6:
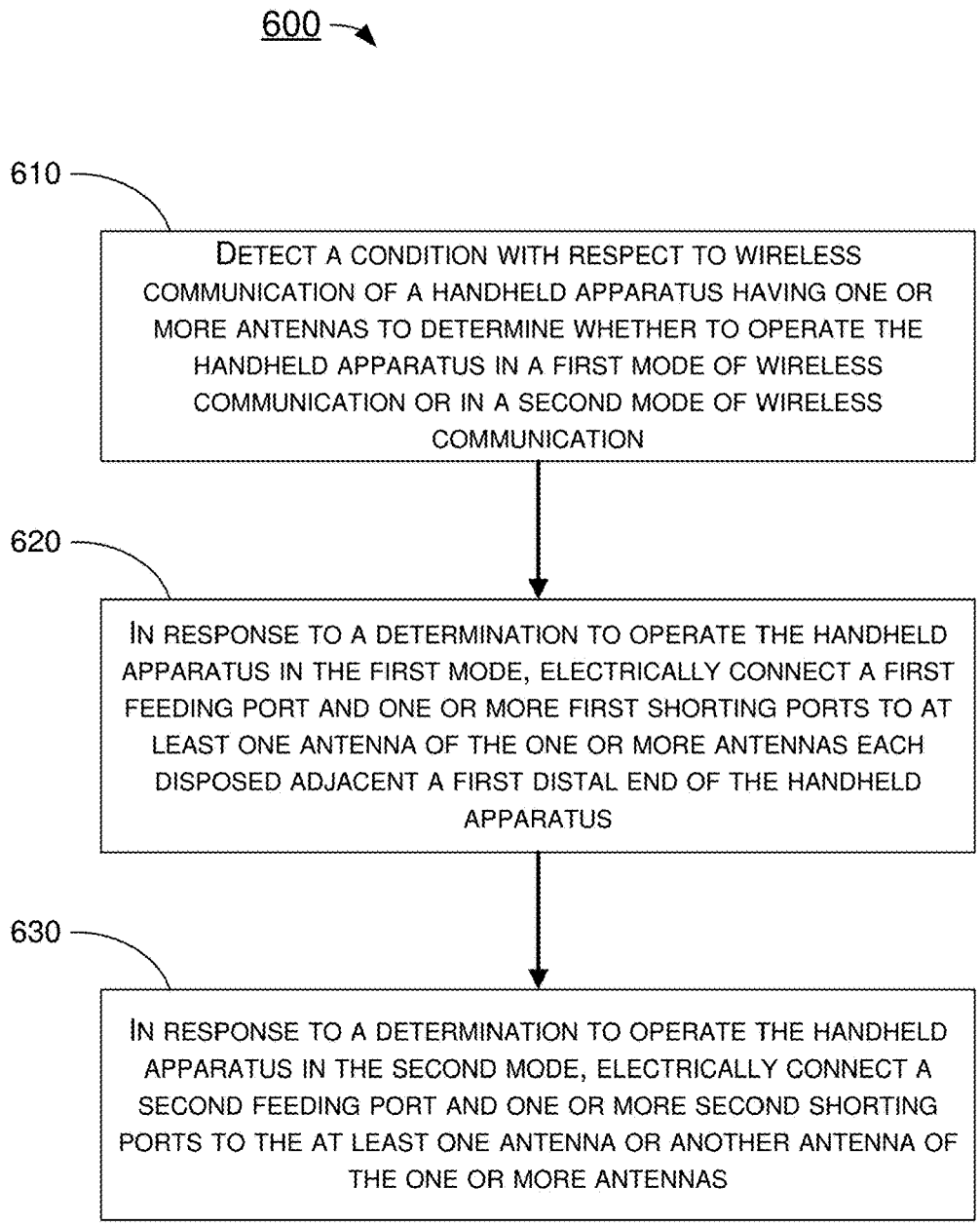
FIG. 6 is a flowchart of an example process in accordance with another implementation of the present disclosure.
Figure 7:
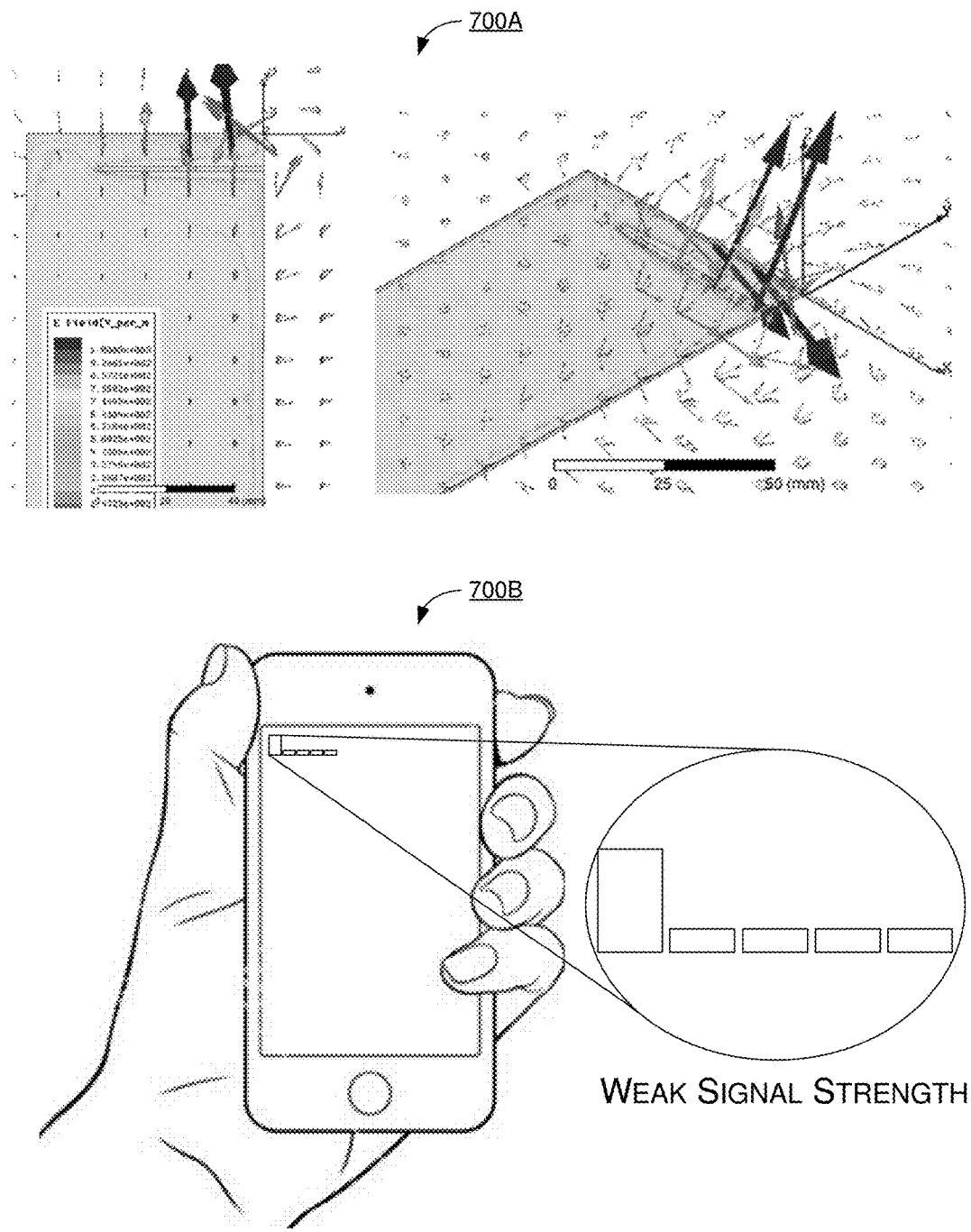
FIG. 7 is a diagram of antenna radiation and impact on radio signals by human hand.
Figure 8:
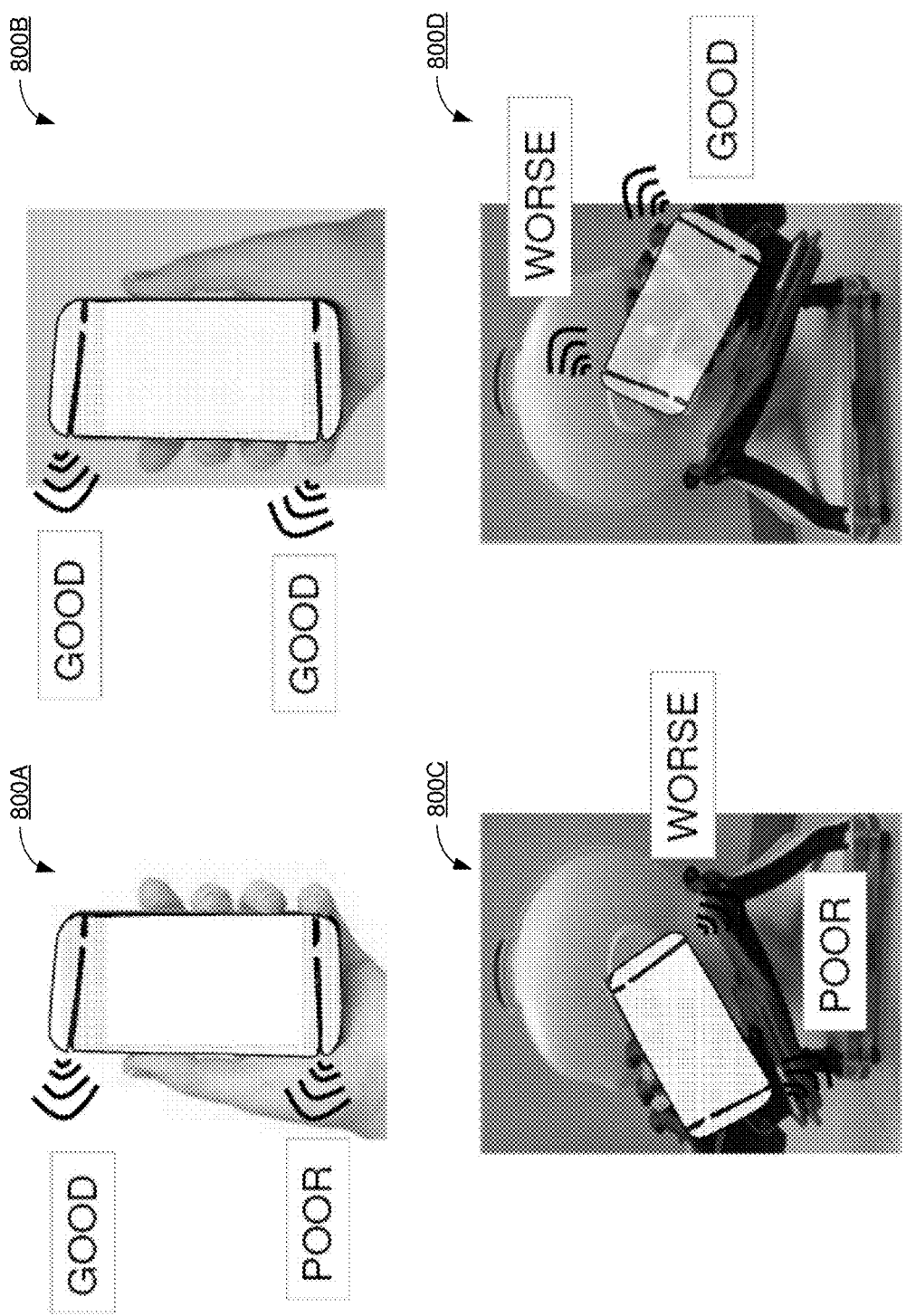
FIG. 8 is a diagram of impacts on radio signals of a handheld apparatus by head and hand of a user.

FIG. 6 illustrates an example process 600 in accordance with another implementation of the present disclosure. Process 600 may include one or more operations, actions, or functions as represented by one or more of blocks 610, 620 and 630. Although illustrated as discrete blocks, various blocks of process 600 may be divided into additional blocks, combined into fewer blocks, or eliminated, depending on the desired implementation. The blocks may be performed in the order shown in FIG. 6 or in any other order, depending on the desired implementation. Process 600 may be implemented by apparatus 100 or any suitable control logic or processor of a handheld apparatus in which one or more implementations in accordance with the present disclosure is/are applied. Solely for illustrative purpose and without limiting the scope of the present disclosure, process 600 is described below in the context of process 600 being performed by apparatus 100. Process 600 may begin at 610.

At 610, process 600 may involve control circuit 130 detecting a condition with respect to wireless communication of apparatus 100 having one or more antennas 110 to determine whether to operate apparatus 100 in a first mode of wireless communication or in a second mode of wireless communication. Process 600 may proceed from 610 to 620.

At 620, in response to a determination by control circuit 130 to operate apparatus 100 in the first mode, process 600 may involve control circuit 130 electrically connecting a first feeding port 160 and one or more first shorting ports 170 to at least one antenna of the one or more antennas 110 each disposed adjacent a first distal end of apparatus 100.

At 630, in response to a determination by control circuit 130 to operate apparatus 100 in the second mode, process 600 may involve control circuit 130 electrically connecting a second feeding port 180 and one or more second shorting ports 190 to the at least one antenna or another antenna of the one or more antennas 110.

In some implementations, in the first mode of wireless communication, the one or more antennas may wirelessly transmit and receive with a first radiation pattern, and, in the second mode of wireless communication, the one or more antennas may wirelessly transmit and receive with a second radiation pattern different from the first radiation pattern.

In some implementations, process 600 may involve second signal processing circuit 150 receiving wireless signals through auxiliary antenna 120 to supplement wireless receiving by the one or more antennas 110 in each of the first mode and the second mode of wireless communication. The auxiliary antenna may be disposed adjacent a second distal end of apparatus 100 opposite the first distal end thereof.

In some implementations, a distance between the first feeding port 160 and a first side (e.g., right side) of casing 105 of apparatus 100 may be less than a distance between the second feeding port 180 and the first side of casing 105 of apparatus 100. Similarly, a distance between the second feeding port 180 and a second side (e.g., left side) of casing 105 of apparatus 100 may be less than a distance between the first feeding port 160 and the second side of casing 105 of apparatus 100. The first side and the second side of apparatus 100 may be opposite to each other.

In some implementations, a distance between the one or more first shorting ports 170 and the first side of casing 105 of apparatus 100 may be less than a distance between the one or more second shorting ports 190 and the first side of casing 105 of apparatus 100. Likewise, a distance between the one or more second shorting ports 190 and the second side of casing 105 of apparatus 100 may be less than a distance between the one or more first shorting ports 170 and the second side of casing 105 of apparatus 100.

In some implementations, the first feeding port 160, the one or more first shorting ports 170, the second feeding port 180, and the one or more second shorting ports 190 may be associated with a first antenna of the one or more antennas 110.

Alternatively, the first feeding port 160 and the one or more first shorting ports 170 may be associated with a first antenna of the one or more antennas 110, while the second feeding port 180 and the one or more second shorting ports 190 may be associated with a second antenna of the one or more antennas 110.

Alternatively, the first feeding port 160 and the one or more second shorting ports 190 may be associated with a first antenna of the one or more antennas 110, while the second feeding port 180 and the one or more first shorting ports 170 may be associated with a second antenna of the one or more antennas 110.

In some implementations, in detecting the condition with respect to wireless communication of apparatus 100 having one or more antennas 110 to determine whether to operate apparatus 100 in the first mode of wireless communication or in the second mode of wireless communication, process 600 may involve control circuit 130 performing a number of operations. For instance, process 600 may involve control circuit 130 detecting a first radiation strength associated with a first signal received or transmitted by the one or more antennas 110 in the first mode of wireless communication. Process 600 may also involve control circuit 130 detecting a second radiation strength associated with a second signal received or transmitted by the one or more antennas 110 in the second mode of wireless communication. Process 600 may further involve control circuit 130 performing a comparison involving the first radiation strength and the second radiation strength. Process 600 may additionally involve control circuit 130 determining to operate apparatus 100 in either the first mode of wireless communication or the second mode of wireless communication based on a result of the comparison.

In some implementations, in determining to operate apparatus 100 in either the first mode of wireless communication or the second mode of wireless communication based on the result of the comparison, process 600 may involve control circuit 130 performing a number of operations. For instance, process 600 may involve control circuit 130 determining to operate apparatus 100 in the first mode of wireless communication in response to the result of the comparison indicating the first radiation strength being greater than the second radiation strength. Conversely, process 600 may involve control circuit 130 determining to operate apparatus 100 in the second mode of wireless communication in response to the result of the comparison indicating the second radiation strength being greater than the first radiation strength.

Alternatively or additionally, in detecting the condition with respect to wireless communication of apparatus 100 having one or more antennas 110 to determine whether to operate apparatus 100 in the first mode of wireless communication or in the second mode of wireless communication, process 600 may involve control circuit 130 performing a number of operations. For instance, process 600 may involve control circuit 130 operating apparatus 100 in one of the first mode of wireless communication and the second mode of wireless communication as a default mode of wireless communication. Process 600 may also involve control circuit 130 detecting whether a first radiation strength associated with a first signal received or transmitted by the one or more antennas 110 in the default mode of wireless communication of apparatus 100 is below a threshold. Process 600 may further involve control circuit 130 determining whether to change the default mode of wireless communication of apparatus 100 based on the detecting.

In some implementations, in determining whether to change the default mode of wireless communication of apparatus 100 based on the detecting, process 600 may involve control circuit 130 performing a number of operations. For instance, process 600 may involve control circuit 130 maintaining apparatus 100 in the default mode of wireless communication in response to the first radiation strength associated with the first signal being not below the threshold. Conversely, in response to the first radiation strength associated with the first signal being below the threshold, process 600 may involve control circuit 130 performing additional operations. In particular, process 600 may involve control circuit 130 detecting that a second radiation strength associated with a second signal received or transmitted by the one or more antennas 110 in another mode of wireless communication. Process 600 may also involve control circuit 130 performing a comparison involving the first radiation strength and the second radiation strength. Process 600 may further involve control circuit 130 determining to change apparatus 100 to the another mode of wireless communication in response to a result of the comparison indicating the second radiation strength being greater than the first radiation strength.

In some implementations, the one or more first shorting ports 170 may include a first port directly connected to electrical ground 115, and the one or more second shorting ports 190 may include a second port directly connected to electrical ground 115.

In some implementations, the one or more first shorting ports 170 may include a first port connected to electrical ground 115 through one or more first electrical elements 175, and the one or more second shorting ports 190 may include a second port connected to electrical ground 115 through one or more second electrical elements 195.

In some implementations, the one or more first electrical elements 175 may include a first switching circuit and a plurality of first impedance elements configured to provide different impedance values and serially coupled between the first port and electrical ground 115. Additionally, the one or more second electrical elements 190 may include a second switching circuit and a plurality of second impedance elements configured to provide different impedance values and serially coupled between the second port and electrical ground 115.

In some implementations, the one or more first shorting ports 170 may further include a third port connected to electrical ground 115 through the one or more first electrical elements 175, and the one or more second shorting ports 190 may further include a fourth port connected to electrical ground 115 through the one or more second electrical elements 195. In some implementations, the one or more first electrical elements 175 may include a first switching circuit and a plurality of first impedance elements configured to provide different impedance values and serially coupled between the first port and electrical ground 115, and the one or more second electrical elements 195 may include a second switching circuit and a plurality of second impedance elements configured to provide different impedance values and serially coupled between the second port and electrical ground 115.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
 detecting a condition with respect to wireless communication of a handheld apparatus having one or more antennas to determine whether to operate the handheld apparatus in a first mode of wireless communication or in a second mode of wireless communication;
 in response to a determination to operate the handheld apparatus in the first mode, electrically connecting a first feeding port and one or more first shorting ports to at least one antenna of the one or more antennas each disposed adjacent a first distal end of the handheld apparatus; and
 in response to a determination to operate the handheld apparatus in the second mode, electrically connecting a second feeding port and one or more second shorting ports to the at least one antenna or another antenna of the one or more antennas,
 wherein each of the first feeding port, the second feeding port, the one or more first shorting ports, and the one or more second shorting ports is adjacent the first distal end of the handheld apparatus,
 wherein the at least one antenna has a symmetric antenna structure with a first slot toward a first side of the handheld apparatus and a second slot toward a second side of the handheld apparatus opposite the first side thereof,
 wherein the first slot is associated with the first feeding port and the one or more first shorting ports such that the first slot, the first feeding port and the one or more first shorting ports are utilized in the first mode, and
 wherein the second slot is associated with the second feeding port and the one or more second shorting ports such that the second slot, the second feeding port and the one or more second shorting ports are utilized in the second mode.

2. The method of claim 1, wherein, in the first mode of wireless communication, the one or more antennas wirelessly transmit and receive with a first radiation pattern, and wherein, in the second mode of wireless communication, the one or more antennas wirelessly transmit and receive with a second radiation pattern different from the first radiation pattern.

3. The method of claim 1, further comprising:
 receiving wireless signals through an auxiliary antenna to supplement wireless receiving by the one or more antennas in each of the first mode and the second mode of wireless communication,
 wherein the auxiliary antenna is disposed adjacent a second distal end of the handheld apparatus opposite the first distal end thereof.

4. The method of claim 1, wherein a distance between the first feeding port and a first side of the handheld apparatus is less than a distance between the second feeding port and the first side of the handheld apparatus, wherein a distance between the second feeding port and a second side of the handheld apparatus is less than a distance between the first feeding port and the second side of the handheld apparatus, and wherein the first side and the second side of the handheld apparatus are opposite to each other.

5. The method of claim 4, wherein a distance between the one or more first shorting ports and the first side of the handheld apparatus is less than a distance between the one or more second shorting ports and the first side of the handheld apparatus, and wherein a distance between the one or more second shorting ports and the second side of the handheld apparatus is less than a distance between the one or more first shorting ports and the second side of the handheld apparatus.

6. The method of claim 1, wherein the one or more antennas comprise a cross-polarized log-periodic dipole (CLPD) antenna.

7. The method of claim 1, wherein the first feeding port and the one or more first shorting ports are associated with a first antenna of the one or more antennas, and wherein the second feeding port and the one or more second shorting ports are associated with a second antenna of the one or more antennas.

8. The method of claim 1, wherein the first feeding port and the one or more second shorting ports are associated with a first antenna of the one or more antennas, and wherein the second feeding port and the one or more first shorting ports are associated with a second antenna of the one or more antennas.

9. The method of claim 1, wherein the detecting of the condition with respect to wireless communication of the handheld apparatus having one or more antennas to determine whether to operate the handheld apparatus in the first mode of wireless communication or in the second mode of wireless communication comprises:
  detecting a first radiation strength associated with a first signal received or transmitted by the one or more antennas in the first mode of wireless communication;
  detecting a second radiation strength associated with a second signal received or transmitted by the one or more antennas in the second mode of wireless communication;
  performing a comparison involving the first radiation strength and the second radiation strength; and
  determining to operate the handheld apparatus in either the first mode of wireless communication or the second mode of wireless communication based on a result of the comparison.

10. The method of claim 9, wherein the determining to operate the handheld apparatus in either the first mode of wireless communication or the second mode of wireless communication based on the result of the comparison comprises:
  determining to operate the handheld apparatus in the first mode of wireless communication in response to the result of the comparison indicating the first radiation strength being greater than the second radiation strength; and
  determining to operate the handheld apparatus in the second mode of wireless communication in response to the result of the comparison indicating the second radiation strength being greater than the first radiation strength.

11. The method of claim 1, wherein the detecting of the condition with respect to wireless communication of the handheld apparatus having one or more antennas to determine whether to operate the handheld apparatus in the first mode of wireless communication or in the second mode of wireless communication comprises:
  operating the handheld apparatus in one of the first mode of wireless communication and the second mode of wireless communication as a default mode of wireless communication;
  detecting whether a first radiation strength associated with a first signal received or transmitted by the one or more antennas in the default mode of wireless communication of the handheld apparatus is below a threshold; and
  determining whether to change the default mode of wireless communication of the handheld apparatus based on the detecting.

12. The method of claim 11, wherein the determining of whether to change the default mode of wireless communication of the handheld apparatus based on the detecting comprises:
  in response to the first radiation strength associated with the first signal being not below the threshold, maintaining the handheld apparatus in the default mode of wireless communication; and
  in response to the first radiation strength associated with the first signal being below the threshold, performing operations comprising:
    detecting that a second radiation strength associated with a second signal received or transmitted by the one or more antennas in another mode of wireless communication;
    performing a comparison involving the first radiation strength and the second radiation strength; and
    determining to change the handheld apparatus to the another mode of wireless communication in response to a result of the comparison indicating the second radiation strength being greater than the first radiation strength.

13. The method of claim 1, wherein the one or more first shorting ports comprise a first port directly connected to an electrical ground, and wherein the one or more second shorting ports comprise a second port directly connected to the electrical ground.

14. The method of claim 1, wherein the one or more first shorting ports comprise a first port connected to an electrical ground through one or more first electrical elements, and wherein the one or more second shorting ports comprise a second port connected to the electrical ground through one or more second electrical elements.

15. The method of claim 14, wherein the one or more first electrical elements comprise a first switching circuit and a plurality of first impedance elements configured to provide different impedance values and serially coupled between the first port and the electrical ground, and wherein the one or more second electrical elements comprise a second switching circuit and a plurality of second impedance elements configured to provide different impedance values and serially coupled between the second port and the electrical ground.

16. The method of claim 14, wherein the one or more first shorting ports further comprise a third port connected to the electrical ground through the one or more first electrical elements, and wherein the one or more second shorting ports further comprise a fourth port connected to the electrical ground through the one or more second electrical elements.

17. The method of claim 16, wherein the one or more first electrical elements comprise a first switching circuit and a plurality of first impedance elements configured to provide different impedance values and serially coupled between the first port and the electrical ground, and wherein the one or more second electrical elements comprise a second switching circuit and a plurality of second impedance elements configured to provide different impedance values and serially coupled between the second port and the electrical ground.

18. An apparatus, comprising:
  a casing having a first distal end, a second distal end opposite the first distal end, a first side, and a second side opposite the first side, the first side and the second side disposed between the first distal end and the second distal end;
  one or more antennas disposed adjacent the first distal end of the casing;
  a first feeding port adjacent the first distal end of the casing;
  a second feeding port adjacent the first distal end of the casing;
  one or more first shorting ports adjacent the first distal end of the casing;
  one or more second shorting ports adjacent the first distal end of the casing; and
  a control circuit communicatively coupled to the one or more antennas and configured to perform operations comprising:
    detecting a condition with respect to wireless communication through the one or more antennas to determine whether to operate in a first mode of wireless communication or in a second mode of wireless communication;
    in response to a determination to operate in the first mode, electrically connecting the first feeding port and the one or more first shorting ports to at least one antenna of the one or more antennas; and in response to a determination to operate in the second mode, electrically connecting the second feeding port and the one or more second shorting ports to the at least one antenna of the one or more antennas, wherein the at least one antenna has a symmetric antenna structure with a first slot toward the first side of the casing and a second slot toward the second side of the casing, wherein the first slot is associated with the first feeding port and the one or more first shorting ports such that the first slot, the first feeding port and the one or more first shorting ports are utilized in the first mode, and wherein the second slot is associated with the second feeding port and the one or more second shorting ports such that the second slot, the second feeding port and the one or more second shorting ports are utilized in the second mode.

19. The apparatus of claim 18, wherein, in the first mode of wireless communication, the one or more antennas wirelessly transmit and receive with a first radiation pattern, and wherein, in the second mode of wireless communication, the one or more antennas wirelessly transmit and receive with a second radiation pattern different from the first radiation pattern.

20. The apparatus of claim 18, further comprising:
an auxiliary antenna disposed adjacent the second distal end of the casing,
wherein the control circuit is further configured to receive wireless signals through the auxiliary antenna to supplement wireless receiving by the one or more antennas in each of the first mode and the second mode of wireless communication.

21. The apparatus of claim 18, wherein a distance between the first feeding port and the first side of the casing is less than a distance between the second feeding port and the first side of the casing, and wherein a distance between the second feeding port and the second side of the casing is less than a distance between the first feeding port and the second side of the casing.

22. The apparatus of claim 21, wherein a distance between the one or more first shorting ports and the first side of the casing is less than a distance between the one or more second shorting ports and the first side of the casing, and wherein a distance between the one or more second shorting ports and the second side of the casing is less than a distance between the one or more first shorting ports and the second side of the casing.

23. The apparatus of claim 18, wherein the one or more antennas form a cross-polarized log-periodic dipole (CLPD) antenna.

24. The apparatus of claim 18, wherein the first feeding port and the one or more first shorting ports are associated with a first antenna of the one or more antennas, and wherein the second feeding port and the one or more second shorting ports are associated with a second antenna of the one or more antennas.

25. The apparatus of claim 18, wherein the first feeding port and the one or more second shorting ports are associated with a first antenna of the one or more antennas, and wherein the second feeding port and the one or more first shorting ports are associated with a second antenna of the one or more antennas.

26. The apparatus of claim 18, wherein, in detecting the condition with respect to wireless communication through the one or more antennas to determine whether to operate in the first mode of wireless communication or in the second mode of wireless communication, the control circuit is configured to perform operations comprising:

detecting a first radiation strength associated with a first signal received or transmitted by the one or more antennas in the first mode of wireless communication;

detecting a second radiation strength associated with a second signal received or transmitted by the one or more antennas in the second mode of wireless communication;

performing a comparison involving the first radiation strength and the second radiation strength; and determining to operate in either the first mode of wireless communication or the second mode of wireless communication based on a result of the comparison.

27. The apparatus of claim 26, wherein, in determining to operate in either the first mode of wireless communication or the second mode of wireless communication based on the result of the comparison, the control circuit is configured to perform operations comprising:

determining to operate in the first mode of wireless communication in response to the result of the comparison indicating the first radiation strength being greater than the second radiation strength; and determining to operate in the second mode of wireless communication in response to the result of the comparison indicating the second radiation strength being greater than the first radiation strength.

28. The apparatus of claim 18, wherein, in detecting the condition with respect to wireless communication through the one or more antennas to determine whether to operate in the first mode of wireless communication or in the second mode of wireless communication, the control circuit is configured to perform operations comprising:

operating in one of the first mode of wireless communication and the second mode of wireless communication as a default mode of wireless communication;

detecting whether a first radiation strength associated with a first signal received or transmitted by the one or more antennas in the default mode of wireless communication is below a threshold; and determining whether to change the default mode of wireless communication based on the detecting.

29. The apparatus of claim 28, wherein, in determining whether to change the default mode of wireless communication based on the detecting, the control circuit is configured to perform operations comprising:

in response to the first radiation strength associated with the first signal being not below the threshold, maintaining in the default mode of wireless communication; and in response to the first radiation strength associated with the first signal being below the threshold, performing operations comprising:

detecting that a second radiation strength associated with a second signal received or transmitted by the one or more antennas in another mode of wireless communication;

performing a comparison involving the first radiation strength and the second radiation strength; and determining to change from the default mode to the another mode of wireless communication in response to a result of the comparison indicating the second radiation strength being greater than the first radiation strength.

30. The apparatus of claim 18, wherein the one or more first shorting ports comprise a first port directly connected to an electrical ground, and wherein the one or more second shorting ports comprise a second port directly connected to the electrical ground.

31. The apparatus of claim 18, further comprising:
one or more first electrical elements; and
one or more second electrical elements,
wherein the one or more first shorting ports comprise a first port connected to an electrical ground through the one or more first electrical elements, and
wherein the one or more second shorting ports comprise a second port connected to the electrical ground through the one or more second electrical elements.

32. The apparatus of claim 31, wherein the one or more first electrical elements comprise a first switching circuit and a plurality of first impedance elements configured to provide different impedance values and serially coupled between the first port and the electrical ground, and wherein the one or more second electrical elements comprise a second switching circuit and a plurality of second impedance elements configured to provide different impedance values and serially coupled between the second port and the electrical ground.

33. The apparatus of claim 31, wherein the one or more first shorting ports further comprise a third port connected to the electrical ground through the one or more first electrical elements, and wherein the one or more second shorting ports further comprise a fourth port connected to the electrical ground through the one or more second electrical elements.

34. The apparatus of claim 33, wherein the one or more first electrical elements comprise a first switching circuit and a plurality of first impedance elements configured to provide different impedance values and serially coupled between the first port and the electrical ground, and wherein the one or more second electrical elements comprise a second switching circuit and a plurality of second impedance elements configured to provide different impedance values and serially coupled between the second port and the electrical ground.

* * * * *